Dec. 30, 1941. G. A. REINHARD 2,268,305
TRANSMISSION
Filed Dec. 2, 1940
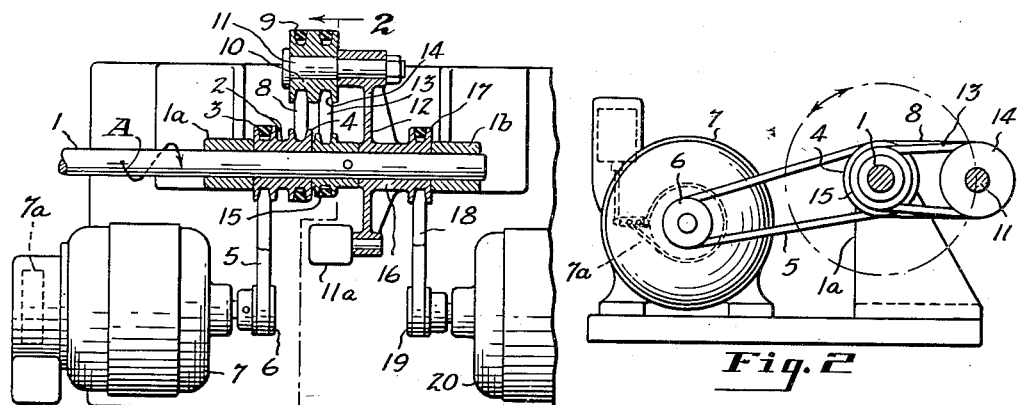
Fig.1  Fig.2
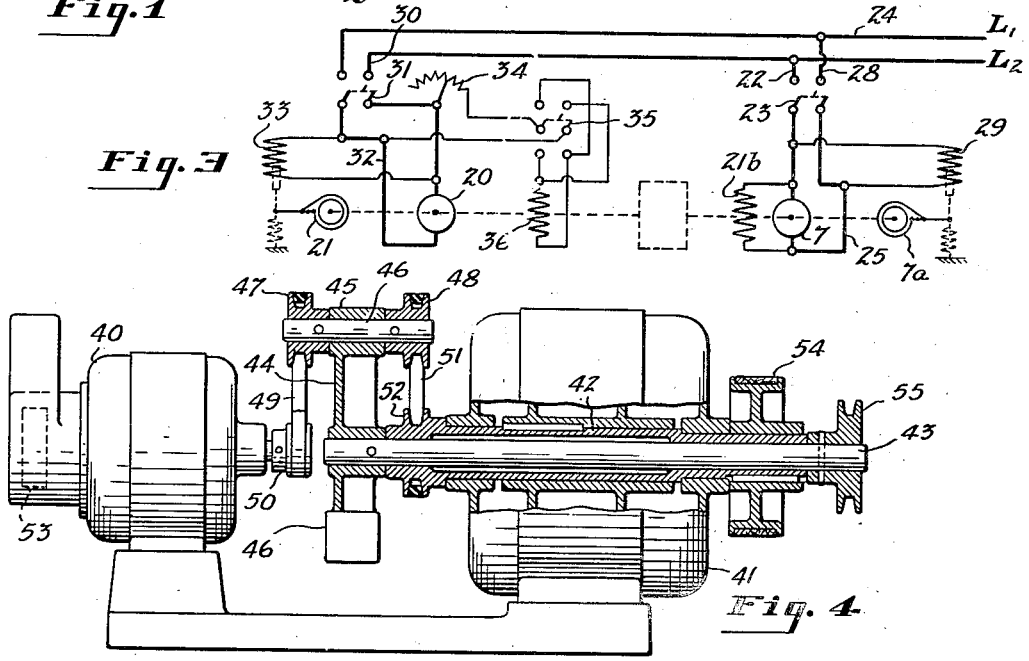
Fig.3
Fig.4
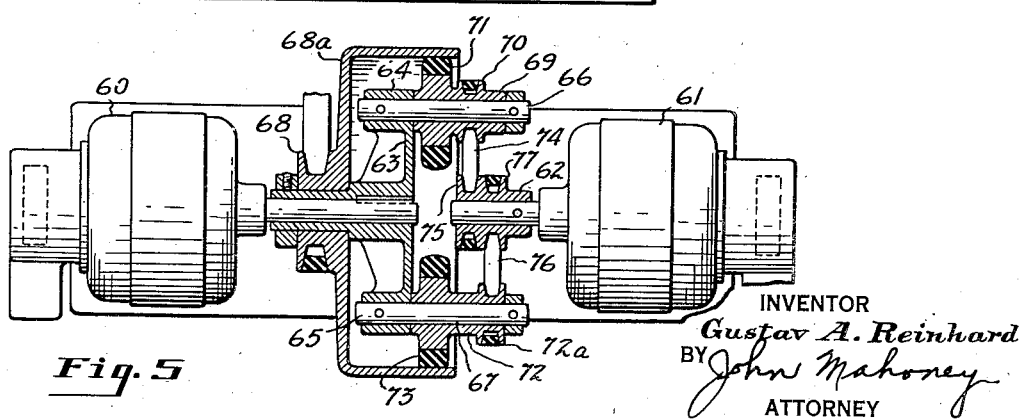
Fig.5
INVENTOR
Gustav A. Reinhard
BY John Mahoney
ATTORNEY Patented Dec. 30, 1941

2,268,305

UNITED STATES PATENT OFFICE 2,268,305

TRANSMISSION

Gustav A. Reinhard, Shaker Heights, Ohio, assignor of fifty-one per cent to J. L. Vergilio, Cleveland, Ohio Application December 2, 1940, Serial No. 368,221

15 Claims. (Cl. 74—217)

My invention relates to transmission means and more particularly to transmission means for efficiently driving a shaft at substantially any desired speed independently of the load.

The inefficiency in utilizing a single motor for driving members, such as shafts or pulleys, in which the speed of the shaft and the load, or both, is subject to variation, is well known. In such cases, it is necessary to provide driving means having sufficient power to drive the heaviest load at the desired speed and to dissipate power when either the load or speed, or both, is reduced. To overcome this difficulty, it has been proposed to utilize two motors associated with a planetary type of gearing. Such apparatus, however, is expensive, subject to noise, and it is difficult to drive the shaft at a high rate of speed and to provide the desired ratio of speed between the two motors.

It is the aim of the present invention to provide an improved transmission in which planetary gearing is entirely eliminated and by means of which the desired speed may be maintained independent of the load and in which the power consumed may be substantially reduced at all speeds below a specified standard speed. It is also a purpose of my invention to provide an improved transmission in which alternating current motors, and particularly those of the squirrel cage induction type, may be utilized in association with improved transmission means for maintaining, adjusting or varying the speed of a driven shaft independently of the load.

My invention will be better understood by reference to the accompanying drawing, in which:

Fig. 1 is a plan view of my improved apparatus with portions in section;

Fig. 2 is a view on a plane indicated by the line 2—2 of Fig. 1, showing parts in section and parts in elevation and has revolvable pulley in a different position;

Fig. 3 is a diagrammatic view showing the electrical connections for the motors disclosed in Fig. 1;

Fig. 4 is a view, partly in elevation and partly in section of my improved apparatus in which motors of the induction type are utilized; and Fig. 5 is a plan view, partly in section, of a modified arrangement of my improved apparatus.

As illustrated in the drawing, improved means are provided to rotate a driven member, such as a shaft or pulley, at substantially any desired speed independent of the load and consists essentially of two driving members which may be operated from the same or different sources of power, and the speed of one of which is variable, and while I do not desire to be limited to the specific arrangement shown in the drawing, for purposes of illustration, one modification of my invention is shown in Figs. 1, 2 and 3 in which a shaft 1 to be driven, supported in bearings 1a and 1b, has rotatably mounted thereon a sleeve 2 provided with V-groove pulleys 3 and 4, the sleeve 2 being rotated by means of an endless belt 5 trained over pulleys 3 and a V-groove pulley 6 attached to the driving shaft of a motor 7 provided with a brake 7a, which motor may be of any desired type but which, as illustrated, is a direct current motor of the single speed type.

As illustrated, power is transmitted from the sleeve 2 to the driving shaft 1 by means of an endless belt 8 trained over pulley 4 and a portion 9 of a double pulley 10 rotatably mounted upon a stud 11 which is maintained at a predetermined distance from the shaft 1 by any suitable member, such as a bracket 12, the power being transmitted to the driven shaft by means of an endless belt 13 trained over the portion 14 of pulley 10 and a V-groove pulley 15 which is affixed to the driven shaft 1.

In the arrangement thus described, it will be apparent that as the load upon shaft 1 is increased, the speed of motor 7 decreases and that under ordinary arrangements, it is necessary to provide a motor having sufficient power to drive the shaft at the maximum speed desired when the heaviest load is applied and to dissipate the power when the speed or load, or both, are decreased.

According to my invention, improved means are provided to supplement or diminish the effect of the motor 7 in driving shaft 1 by revolving stud 11 around the shaft 1, its revolution in one direction being effective in decreasing the speed of shaft 1 and its revolution in the opposite direction being effective in increasing the speed of the shaft. While any desirable means may be provided for this purpose, as illustrated in the drawing, a suitable member, such as a bracket 12 terminating in a sleeve 16 is rotatably mounted upon shaft 1 and is provided with a V-groove pulley 17 which is driven by a belt 18 trained over a pulley 19 connected to the driving shaft of a variable speed motor 20.

With the foregoing arrangement, it will be apparent that when motor 7 is driven to rotate shaft 1 in a counterclockwise direction as indicated by arrow A through pulleys 5, 8 and 13, the revolution of stud 11 by motor 20 about shaft 1 in the same direction will diminish the effect of motor 7 and the shaft will be driven at a lower speed. When it is desired to increase the speed of shaft 1, or to maintain its speed constant when a heavier load is applied, stud 11 is therefore revolved around shaft 1 in a clockwise direction as viewed from the right of the bracket. As illustrated diagrammatically in Fig. 3, the motor 20 is also provided with braking means 21 to arrest the revolution of the stud 11 after the motor has been disconnected, and bracket 12 is extended below sleeve 12 and is provided with a weight 11a to counterbalance the effect of stud 11 and pulley 10. It will be understood that instead of utilizing a bracket 12 and weight 11a, a wheel or other suitable member having a suitable bearing may be provided and when the term bracket is utilized in the specification and claims, it is understood that any suitable equivalent means may be substituted therefor.

A wiring diagram of the connections to the motor is shown in Fig. 3, the current being conducted to both motors from a suitable source of electrical energy $L_1L_2$. As illustrated, current passes from line $L_1$ and conductor 28 through a suitable switch 23 and conductor 25 to the motor 7 which is provided with the usual field circuit 21b and returns to line $L_2$ through switch 23 and conductor 22, a parallel circuit being provided to energize solenoid 29 for releasing brake 7a. In a like manner current passes from line $L_1$ through switch 31 and conductor 32 to motor 20 and returns by switch 31 and conductor 30 to line $L^2$, a solenoid 33 being connected in parallel with this circuit to release brake 21. A rheostat 34 and a reversing switch 35 is included in the field circuit 36 of motor 20 to vary the speed and provide reversibility.

Another modification of my invention is shown in Fig. 4 of the drawing in which two motors are utilized to drive a shaft at various speeds. While the motors may be of various types and may be single or multiple speed, for purposes of illustration, two motors 40 and 41 of the induction type are shown, each of which is adapted to be operated in both directions.

Motor 40 is a standard squirrel cage motor and motor 41 is similar thereto with the exception that its rotor is made in the form of a sleeve 42 and extends outwardly at both ends beyond the motor to provide bearings for a shaft 43 to be driven. It will be understood that the synchronous speed of the motors may be the same or different speeds. As illustrated, one end of shaft 43 is provided with a bracket 44 terminating in a sleeve 45 which forms a bearing for a pulley shaft 46 and has a counterbalancing weight 46 at the other end. The opposite end of the shaft may be connected to any desired load and as shown is provided with a pulley 55 for this purpose.

As in the modification shown in Figs. 1 to 3, inclusive, means are provided to rotate shaft 43 at various speeds independent of the load. For this purpose, pulley shaft 46 is provided with two pulleys, such as V-groove pulleys 47 and 48, secured to the shaft and an endless belt 49 is trained over pulley 47 and a V-groove pulley 50 attached to the driving shaft of induction motor 40, and an endless belt 51 is trained over V-groove pulley 48 and a V-groove pulley 52 secured to the rotor of induction motor 41. It will be understood that the ratio of pulley 50 to pulley 47 must be different than the ratio of pulley 52 to pulley 48; otherwise, infinite speed will be obtained.

In the construction shown, it is apparent that since both pulleys 47 and 48 are rigidly connected to shaft 46, both pulleys must rotate at the same speed and in the same direction and that any differential in speed at which motor 40 attempts to rotate pulley 44 must be compensated for by the rotation of bracket 48 and shaft 43. For instance, assuming that motor 40 attempts to rotate pulley 47 in a clockwise direction as viewed from the left of the pulley at a speed higher than motor 41 attempts to rotate pulley 48 in the same direction and the ratio of pulley 48 with respect to pulley 52 is greater than the ratio of pulley 47 with respect to pulley 50, it is apparent that bracket 44 and shaft 43 must be driven in a clockwise direction as viewed from the left of the bracket to equalize the speed of pulleys 47 and 48.

To obtain higher speeds under such conditions, motor 40 may be rotated to drive pulley 47 clockwise and brake 54 may be applied to rotor 42 or rotor 42 may be operated to drive pulley 48 in a counterclockwise direction, while to drive shaft 43 at a lower speed, motor 41 may be rotated to drive pulley 48 in either a clockwise or counterclockwise direction depending upon the desired direction of rotation of shaft 43, and brake 53 applied to motor 40.

It will be apparent that by providing different ratios between pulley 50 and pulley 47 on the one hand and pulley 52 and pulley 48 on the other hand, the shaft 43 may be operated at a large number of different speeds in either direction even when induction motors are utilized. If multiple speed motors are substituted for the induction motors, the number of different speeds obtained may be greatly increased. I prefer to utilize induction motors, however, because they are less costly to maintain and have higher efficiency.

When induction motors of the type disclosed are utilized, it will be understood that when either pulley 47 or 48 are operated at such speed that the rotor of either motor is driven above its synchronous speed in the same direction as it rotates as a motor, it will act as an induction generator, returning power to the line. In such case a resistor similar to the one shown at 34 in Fig. 3 may be inserted between the induction motor and the line to regulate the speed at which the induction motor operating as a generator is driven. In such cases the speed at which the driven shaft is rotated may be varied.

Another form of my invention is shown in Fig. 5 of the drawing in which the arrangement is somewhat similar to that shown in Fig. 1 to 3 and in which motors of any desired type may be employed. As shown motors 60 and 61 are utilized, motor 61 being provided with a sleeve 62 affixed to its driving shaft and motor 60 having a bracket 63 keyed to its shaft terminating in oppositely disposed bearings 64 and 65 for receiving pulley shafts 66 and 67.

As illustrated in the drawing, means are provided to operate a pulley 68 through a drum 68a at any desired speed irrespective of the load. For this purpose, pulley shaft 66 supports a sleeve 69 provided with a V-groove 70 and a roller 71 in frictional engagement with drum 68a, and in a like manner pulley shaft 67 supports a rotatable sleeve 72 provided with a V-groove and a roller 73 in frictional engagement with drum 68. Sleeve 69 is rotated by means of an endless belt 74 trained over V-groove pulley 70 and V-groove pulley 75 on sleeve 62 and in a like manner sleeve 72 is rotated by means of an endless belt 76 trained over V-groove pulley 72a on sleeve 72 and V-groove pulley 77 on sleeve 62.

When the shaft of motor 61 is operated, frictional member 71 and 73 are also rotated which in turn rotate drum 68a and pulley 78. To increase the speed of pulley 68, motor 60 is operated in one direction to revolve the frictional members within the drum in the same rotary direction as the frictional members are rotating, and to decrease the speed motor 60 is rotated in the opposite direction.

What I claim is:

1. Apparatus of the class described comprising a member to be driven having a pulley secured thereto, a second rotatable pulley spaced inwardly from and mounted to revolve concentrically with respect to said member, an endless belt arranged on said pulleys, means including a third pulley rotatably mounted on the member to be driven and spaced inwardly from the second pulley for rotating the second pulley to drive said member and means for revolving the second pulley about the driven member in either direction to vary the speed of the driven member.

2. Apparatus of the class described comprising a member to be driven having a pulley spaced outwardly from and secured thereto, a second pulley mounted to revolve concentrically with respect to said member, an endless belt arranged on said pulleys, motor means for rotating the second pulley to drive said member, and means including a reversible motor having a variable speed and a third pulley rotatably mounted on said member and spaced inwardly from the second pulley for revolving the second pulley about said driven member in either direction to vary the speed of said driven member.

3. Apparatus of the class described comprising a shaft to be driven, a bracket mounted on said shaft having a bearing spaced from the driven shaft, a countershaft mounted in said bearing, a pulley arranged on said countershaft which is in operative association with said driven shaft, and means for driving said shaft including means for rotating said pulley and means for revolving said pulley about and relative to the driven shaft in either direction to vary the rotative speed of said pulley and said driven shaft.

4. Apparatus of the class described comprising a shaft to be driven having a pulley affixed thereto, a bracket rotatably mounted on said shaft having a bearing at one end and a counterweight at the opposite end, a countershaft mounted in said bearing having a second pulley rotatable thereon, an endless belt connecting said pulleys, means independently of the first pulley for rotating the second pulley to drive said shaft and means for rotating said bracket upon said shaft to revolve the second pulley about said shaft.

5. Apparatus of the class described comprising a shaft to be driven having a bracket secured thereto provided with a bearing, a countershaft mounted in said bearing having first and second rotatable elements secured thereto, and means for driving said shaft including two driving means, one of said driving means being provided with a rotatable member arranged concentrically with respect to said shaft which is in driving connection with the first rotatable element and the second driving means having a rotatable member arranged concentrically with respect to said shaft which is in driving connection with the second rotatable element, and the ratio of the rotatable member of the first driving member with respect to its driven element being different than the ratio of the rotatable member of the second driving means with respect to its driven element.

6. Apparatus of the class described comprising a shaft to be driven having a bracket secured thereto, a countershaft mounted in said bracket having a first and second pulley secured thereto, and means for driving said shaft including two driving means, one of said driving means being provided with a third rotatable pulley concentric with the axis of said shaft which is connected to rotate the first pulley and the second driving means being provided with a fourth pulley which is concentric with the axis of said shaft and connected to rotate the second pulley, and the ratio of the first pulley with respect to the third pulley being different than the ratio of the second pulley with respect to the fourth pulley.

7. Apparatus of the class described comprising a shaft to be driven having a bracket secured thereto, a countershaft having a first and second pulley secured thereto and means for driving said shaft at adjustable speeds including a first and second reversible induction motor, each of which has a pulley associated therewith which is concentric with the axis of said shaft, the pulley associated with the first induction motor being connected to rotate the first pulley on said countershaft and the pulley on the second induction motor being connected to rotate the second pulley on said countershaft and the ratio of the first countershaft pulley with respect to its driving pulley being different than the ratio of the second countershaft pulley with respect to its driving pulley.

8. Apparatus for driving a shaft at adjustable speeds comprising a reversible induction motor having a hollow rotor with a pulley thereon, a shaft to be driven extending through said rotor and having a bracket secured thereto, said bracket being provided with a bearing supporting a countershaft, first and second pulleys secured to said countershaft, a second reversible induction motor having a pulley associated therewith which is arranged concentrically with said shaft, the pulley on the second induction motor being connected to rotate the first countershaft pulley and the pulley on the rotor of the first induction motor being connected to rotate the second countershaft pulley, and the ratio of one countershaft pulley to its driving pulley being different than the ratio of the other countershaft pulley to its driving pulley.

9. Apparatus for driving a shaft at variable speeds comprising a shaft to be driven having a bracket secured thereto provided with a bearing, a countershaft arranged in said bearing having a first and second pulley secured thereto, and means for driving said shaft at variable speeds including a first and second reversible induction motor, each of which has a pulley associated therewith which is concentric with the axis of said shaft, the pulley of the first induction motor being connected to rotate the first countershaft pulley and the pulley of the second induction motor being connected to rotate the second countershaft pulley and the ratio of the first countershaft pulley to its driving shaft being so proportioned with respect to the ratio of the second countershaft pulley to its driving shaft that one of said motors is driven as an induction generator, and a variable resistor connected between the motor driven as an induction generator and its line for varying the speed at which the shaft is driven.

10. Apparatus of the class described comprising a member to be driven having a drum associated therewith and means for driving said member at variable speeds comprising a motor having a bracket arranged inside said drum provided with a bearing, a countershaft supported in said bearing provided with a rotatable sleeve, a rotary member arranged on said sleeve which frictionally engages said drum, a second motor for rotating said sleeve to rotate said drum and the first motor being adapted to revolve said frictional member concentrically with respect to the axis of the driven member to vary the speed of the driven member.

11. Apparatus of the class described comprising a member to be driven having a drum associated therewith and means for driving said member at a variable speed comprising a reversible motor, a bracket secured to said motor and arranged inside said drum, said bracket being provided with a bearing, a countershaft supported in said bearing, a sleeve rotatable on said countershaft having a pulley thereon and a member which frictionally engages said casing, a second motor having a pulley connected to the pulley on said sleeve for rotating said drum and said first motor being adapted to revolve said frictional member concentrically with respect to the axis of the driven member to vary the speed of the driven member.

12. Apparatus of the class described comprising a member to be driven and means for driving said member including a rotatable pulley mounted to revolve concentrically in either direction relative to said member and being operatively associated therewith, means for rotating said pulley and means whereby said pulley may be revolved concentrically about said member to increase the rotative speed of said pulley when the pulley is revolved in a direction opposite to the rotation of said pulley and to decrease the rotative speed of said pulley when the pulley is revolved in the same direction as the rotation of the pulley.

13. Apparatus of the class described comprising a member to be driven and means for driving said member including a first rotatable pulley spaced from but operatively associated with the driven member and mounted to revolve concentrically relative thereto, means for rotating said pulley, a second pulley rotatably mounted on said driven member which is spaced inwardly from and operably associated with the first rotatable pulley to cause revolution of the first pulley about said member at a comparatively high rate of speed, and means for driving the second pulley.

14. Apparatus of the class described comprising a member to be driven and means for driving said member including a bracket mounted upon said member and having a bearing, a pulley shaft mounted in said bearing, means for rotating said pulley, and means for rotating said bracket to revolve said pulley about said member including a second pulley rotatably mounted on said member which is spaced inwardly from and operatively associated with the first rotatable pulley and which is adapted to cause revolution of the first pulley about said member at a comparatively high rate of speed and means for driving the second pulley.

15. Apparatus of the class described comprising a shaft to be driven having a bracket secured thereto provided with a bearing, a countershaft mounted in said bearing having first and second rotatable elements secured thereto and means for driving said shaft including two driving means, one of said driving means having a rotatable member operatively associated therewith which is arranged concentrically with respect to said shaft and which is in driving connection with the first rotatable element and the second driving means having a rotatable member operatively associated therewith which is arranged concentrically with respect to said shaft and which is in driving connection with the second rotatable element and the ratio of the rotatable member associated with the first driving member with respect to its driving element being different than the ratio of the rotatable member associated with the second driving means with respect to its driven element.

GUSTAV A. REINHARD.